US009900251B1

(12) United States Patent
Wang et al.

(10) Patent No.: US 9,900,251 B1
(45) Date of Patent: Feb. 20, 2018

(54) BANDWIDTH SENTINEL

(75) Inventors: Huizhao Wang, San Jose, CA (US); Changming Liu, Cupertino, CA (US); Peter Wu, Saratoga, CA (US)

(73) Assignee: AEROHIVE NETWORKS, INC., Milpitas, CA (US)

( * ) Notice: Subject to any disclaimer, the term of this patent is extended or adjusted under 35 U.S.C. 154(b) by 0 days.

(21) Appl. No.: 12/834,017

(22) Filed: Jul. 12, 2010

Related U.S. Application Data

(60) Provisional application No. 61/224,716, filed on Jul. 10, 2009.

(51) Int. Cl.
*H04L 12/801* (2013.01)
*H04L 12/803* (2013.01)
*H04L 12/835* (2013.01)

(52) U.S. Cl.
CPC ............ *H04L 47/11* (2013.01); *H04L 47/125* (2013.01); *H04L 47/14* (2013.01); *H04L 47/30* (2013.01)

(58) Field of Classification Search
CPC ....... H04L 47/11; H04L 47/14; H04L 47/125; H04L 47/30
USPC .................................................. 370/252, 229
See application file for complete search history.

(56) References Cited

U.S. PATENT DOCUMENTS

| 5,471,671 A | 11/1995 | Wang et al. |
| 5,697,059 A | 12/1997 | Carney |
| 5,726,984 A | 3/1998 | Kubler et al. |
| 5,956,643 A | 9/1999 | Benveniste |
| 6,061,799 A | 5/2000 | Eldridge et al. |

(Continued)

FOREIGN PATENT DOCUMENTS

| EP | 0940999 | 9/1999 |
| EP | 1732276 | 12/2006 |

(Continued)

OTHER PUBLICATIONS

Clausen, T., et al., Optimized Link State Routing Protocol (OLSR), Network Working Group, Oct. 2003, pp. 1-71.

(Continued)

*Primary Examiner* — Ayaz Sheikh
*Assistant Examiner* — Tarell Hampton
(74) *Attorney, Agent, or Firm* — Sheppard, Mullin, Richter & Hampton LLP

(57) ABSTRACT

Minimum guaranteed wireless network bandwidth is provided to client network devices by monitoring the performance of network connections to identify client network devices experiencing network congestion. Congested network connections are then analyzed to determine the source of the network congestion. Depending upon the source of the network congestion, an embodiment of the invention may undertake steps to either improve the quality of the network connection or to mitigate the impact of this network connection on other network connections. High quality network connections may be allocated additional bandwidth, airtime, or other resources to reduce the network congestion. Low quality network connections are not allocated additional bandwidth, airtime, or other resources. Instead, the impact of this network connection on the other network connections is mitigated. Additionally, the low quality network connection may be transferred to another wireless networking device that may be able to provide a better quality network connection.

21 Claims, 3 Drawing Sheets

(56) References Cited

U.S. PATENT DOCUMENTS

| | | |
|---|---|---|
| 6,112,092 A | 8/2000 | Benveniste |
| 6,154,655 A | 11/2000 | Borst et al. |
| 6,201,792 B1 | 3/2001 | Lahat |
| 6,314,294 B1 | 11/2001 | Benveniste |
| 6,473,413 B1 | 10/2002 | Chiou et al. |
| 6,496,699 B2 | 12/2002 | Benveniste |
| 6,519,461 B1* | 2/2003 | Andersson et al. ............ 455/453 |
| 6,628,623 B1 | 9/2003 | Noy |
| 6,628,938 B1 | 9/2003 | Rachabathuni et al. |
| 6,636,498 B1 | 10/2003 | Leung |
| 6,775,549 B2 | 8/2004 | Benveniste |
| 6,865,393 B1* | 3/2005 | Baum et al. ................ 455/452.2 |
| 6,957,067 B1 | 10/2005 | Iyer et al. |
| 7,002,943 B2 | 2/2006 | Bhagwat et al. |
| 7,057,566 B2 | 6/2006 | Theobold |
| 7,085,224 B1 | 8/2006 | Oran |
| 7,085,241 B1 | 8/2006 | O'Neill et al. |
| 7,130,629 B1 | 10/2006 | Leung et al. |
| 7,154,874 B2 | 12/2006 | Bhagwat et al. |
| 7,164,667 B2 | 1/2007 | Rayment et al. |
| 7,174,170 B2 | 2/2007 | Steer et al. |
| 7,177,646 B2 | 2/2007 | O'Neill et al. |
| 7,181,530 B1 | 2/2007 | Halasz et al. |
| 7,224,697 B2 | 3/2007 | Banerjea et al. |
| 7,216,365 B2 | 5/2007 | Bhagwat et al. |
| 7,251,238 B2 | 7/2007 | Joshi et al. |
| 7,336,670 B1 | 2/2008 | Calhoun |
| 7,339,914 B2 | 3/2008 | Bhagwat et al. |
| 7,346,338 B1 | 3/2008 | Calhoun et al. |
| 7,366,894 B1 | 4/2008 | Kalimuthu et al. |
| 7,370,362 B2 | 5/2008 | Olson et al. |
| 7,440,434 B2 | 10/2008 | Chaskar et al. |
| 7,512,379 B2 | 3/2009 | Nguyen |
| 7,536,723 B1 | 5/2009 | Bhagwat et al. |
| 7,562,384 B1 | 7/2009 | Huang |
| 7,593,356 B1 | 9/2009 | Friday et al. |
| 7,656,822 B1 | 2/2010 | AbdelAziz et al. |
| 7,706,789 B2 | 4/2010 | Qi et al. |
| 7,716,370 B1 | 5/2010 | Devarapalli |
| 7,751,393 B2 | 7/2010 | Chaskar et al. |
| 7,768,952 B2 | 8/2010 | Lee |
| 7,793,104 B2 | 9/2010 | Zheng et al. |
| 7,804,808 B2 | 9/2010 | Bhagwat et al. |
| 7,843,907 B1 | 11/2010 | Abou-Emara et al. |
| 7,844,057 B2 | 11/2010 | Meier et al. |
| 7,856,209 B1 | 12/2010 | Rawat |
| 7,921,185 B2 | 4/2011 | Chawla et al. |
| 7,949,342 B2* | 5/2011 | Cuffaro et al. ............ 455/452.2 |
| 7,961,725 B2 | 6/2011 | Nagarajan et al. |
| 7,970,894 B1 | 6/2011 | Patwardhan |
| 8,000,308 B2 | 8/2011 | Dietrich et al. |
| 8,069,483 B1 | 11/2011 | Matlock |
| 8,219,688 B2 | 7/2012 | Wang |
| 8,249,606 B1 | 8/2012 | Neophytou et al. |
| 8,493,918 B2 | 7/2013 | Karaoguz et al. |
| 8,789,191 B2 | 7/2014 | Bhagwat et al. |
| 8,824,448 B1 | 9/2014 | Narayana et al. |
| 8,948,046 B2 | 2/2015 | Kang et al. |
| 9,003,527 B2 | 4/2015 | Bhagwat et al. |
| 2001/0006508 A1 | 7/2001 | Pankaj et al. |
| 2002/0012320 A1 | 1/2002 | Ogier et al. |
| 2002/0021689 A1 | 2/2002 | Robbins et al. |
| 2002/0071422 A1 | 6/2002 | Amicangioli |
| 2002/0091813 A1 | 7/2002 | Lamberton et al. |
| 2002/0116463 A1 | 8/2002 | Hart |
| 2002/0128984 A1 | 9/2002 | Mehta et al. |
| 2003/0005100 A1 | 1/2003 | Barnard et al. |
| 2003/0039212 A1 | 2/2003 | Lloyd et al. |
| 2003/0087629 A1 | 5/2003 | Juitt |
| 2003/0104814 A1 | 6/2003 | Gwon et al. |
| 2003/0129988 A1 | 7/2003 | Lee et al. |
| 2003/0145091 A1 | 7/2003 | Peng et al. |
| 2003/0179742 A1 | 9/2003 | Ogier et al. |
| 2004/0003285 A1 | 1/2004 | Whelan et al. |
| 2004/0013118 A1 | 1/2004 | Borella |
| 2004/0022222 A1 | 2/2004 | Clisham |
| 2004/0054774 A1 | 3/2004 | Barber et al. |
| 2004/0064467 A1 | 4/2004 | Kola et al. |
| 2004/0077341 A1 | 4/2004 | Chandranmenon et al. |
| 2004/0103282 A1 | 5/2004 | Meier et al. |
| 2004/0109466 A1 | 6/2004 | Van Ackere et al. |
| 2004/0162037 A1 | 8/2004 | Shpak |
| 2004/0185876 A1 | 9/2004 | Groenendaal et al. |
| 2004/0192312 A1 | 9/2004 | Li et al. |
| 2004/0196977 A1 | 10/2004 | Johnson et al. |
| 2004/0236939 A1 | 11/2004 | Watanabe et al. |
| 2004/0255028 A1 | 12/2004 | Chu et al. |
| 2005/0053003 A1* | 3/2005 | Cain et al. .................... 370/235 |
| 2005/0074015 A1 | 4/2005 | Chari et al. |
| 2005/0099983 A1 | 5/2005 | Nakamura et al. |
| 2005/0122946 A1 | 6/2005 | Won |
| 2005/0154774 A1 | 7/2005 | Giaffreda et al. |
| 2005/0207417 A1 | 9/2005 | Ogawa et al. |
| 2005/0259682 A1 | 11/2005 | Yosef et al. |
| 2005/0262266 A1* | 11/2005 | Wiberg et al. ................ 709/238 |
| 2005/0265288 A1 | 12/2005 | Liu et al. |
| 2005/0266848 A1 | 12/2005 | Kim |
| 2006/0010250 A1 | 1/2006 | Eisl et al. |
| 2006/0013179 A1 | 1/2006 | Yamane |
| 2006/0026289 A1 | 2/2006 | Lyndersay et al. |
| 2006/0062250 A1 | 3/2006 | Payne, III |
| 2006/0107050 A1 | 5/2006 | Shih |
| 2006/0117018 A1 | 6/2006 | Christiansen et al. |
| 2006/0140123 A1 | 6/2006 | Conner et al. |
| 2006/0146748 A1 | 7/2006 | Ng et al. |
| 2006/0146846 A1 | 7/2006 | Yarvis et al. |
| 2006/0165015 A1 | 7/2006 | Melick et al. |
| 2006/0187949 A1 | 8/2006 | Seshan et al. |
| 2006/0221920 A1* | 10/2006 | Gopalakrishnan et al. .. 370/338 |
| 2006/0233128 A1 | 10/2006 | Sood et al. |
| 2006/0234701 A1 | 10/2006 | Wang et al. |
| 2006/0245442 A1* | 11/2006 | Srikrishna et al. ........... 370/406 |
| 2006/0251256 A1 | 11/2006 | Asokan et al. |
| 2006/0268802 A1 | 11/2006 | Faccin |
| 2006/0294246 A1 | 12/2006 | Stieglitz et al. |
| 2007/0004394 A1* | 1/2007 | Chu et al. ................. 455/422.1 |
| 2007/0010231 A1 | 1/2007 | Du |
| 2007/0025274 A1 | 2/2007 | Rahman et al. |
| 2007/0025298 A1 | 2/2007 | Jung |
| 2007/0049323 A1 | 3/2007 | Wang et al. |
| 2007/0077937 A1 | 4/2007 | Ramakrishnan et al. |
| 2007/0078663 A1 | 4/2007 | Grace |
| 2007/0082656 A1 | 4/2007 | Stieglitz et al. |
| 2007/0087756 A1 | 4/2007 | Hoffberg |
| 2007/0091859 A1 | 4/2007 | Sethi et al. |
| 2007/0115847 A1 | 5/2007 | Strutt et al. |
| 2007/0116011 A1 | 5/2007 | Lim et al. |
| 2007/0121947 A1 | 5/2007 | Sood et al. |
| 2007/0133407 A1 | 6/2007 | Choi et al. |
| 2007/0140191 A1 | 6/2007 | Kojima |
| 2007/0150720 A1 | 6/2007 | Oh et al. |
| 2007/0153741 A1 | 7/2007 | Blanchette et al. |
| 2007/0156804 A1 | 7/2007 | Mo |
| 2007/0160017 A1 | 7/2007 | Meier et al. |
| 2007/0171885 A1 | 7/2007 | Bhagwat et al. |
| 2007/0192862 A1 | 8/2007 | Vermeulen et al. |
| 2007/0195761 A1 | 8/2007 | Tatar et al. |
| 2007/0247303 A1 | 10/2007 | Payton |
| 2007/0249324 A1 | 10/2007 | Jou et al. |
| 2007/0263532 A1 | 11/2007 | Mirtorabi et al. |
| 2007/0280481 A1 | 12/2007 | Eastlake et al. |
| 2007/0288997 A1 | 12/2007 | Meier et al. |
| 2008/0002642 A1 | 1/2008 | Borkar et al. |
| 2008/0022392 A1 | 1/2008 | Karpati et al. |
| 2008/0037552 A1 | 2/2008 | Dos Remedios et al. |
| 2008/0080369 A1 | 4/2008 | Sumioka |
| 2008/0080377 A1* | 4/2008 | Sasaki et al. ................. 370/233 |
| 2008/0090575 A1 | 4/2008 | Barak et al. |
| 2008/0095094 A1* | 4/2008 | Innami ........................ 370/315 |
| 2008/0095163 A1 | 4/2008 | Chen et al. |
| 2008/0107027 A1 | 5/2008 | Allan et al. |
| 2008/0109879 A1 | 5/2008 | Bhagwat et al. |
| 2008/0130495 A1* | 6/2008 | Dos Remedios et al. .... 370/230 |
| 2008/0146240 A1 | 6/2008 | Trudeau |

(56) References Cited

U.S. PATENT DOCUMENTS

| | | |
|---|---|---|
| 2008/0151751 A1 | 6/2008 | Ponnuswamy et al. |
| 2008/0159128 A1 | 7/2008 | Shaffer |
| 2008/0170527 A1 | 7/2008 | Lundsgaard et al. |
| 2008/0186932 A1 | 8/2008 | Do et al. |
| 2008/0194271 A1 | 8/2008 | Bedekar et al. |
| 2008/0207215 A1* | 8/2008 | Chu et al. .................. 455/452.2 |
| 2008/0212562 A1 | 9/2008 | Bedekar et al. |
| 2008/0219286 A1 | 9/2008 | Ji et al. |
| 2008/0225857 A1 | 9/2008 | Lange |
| 2008/0229095 A1 | 9/2008 | Kalimuthu et al. |
| 2008/0240128 A1 | 10/2008 | Elrod |
| 2008/0253370 A1 | 10/2008 | Cremin et al. |
| 2008/0273520 A1 | 11/2008 | Kim et al. |
| 2008/0279161 A1 | 11/2008 | Stirbu et al. |
| 2009/0019521 A1 | 1/2009 | Vasudevan |
| 2009/0028052 A1* | 1/2009 | Strater et al. .................. 370/241 |
| 2009/0040989 A1 | 2/2009 | da Costa et al. |
| 2009/0043901 A1 | 2/2009 | Mizikovsky et al. |
| 2009/0082025 A1 | 3/2009 | Song |
| 2009/0088152 A1 | 4/2009 | Orlassino |
| 2009/0097436 A1 | 4/2009 | Vasudevan et al. |
| 2009/0111468 A1 | 4/2009 | Burgess et al. |
| 2009/0113018 A1 | 4/2009 | Thomson et al. |
| 2009/0141692 A1 | 6/2009 | Kasslin et al. |
| 2009/0144740 A1 | 6/2009 | Gao |
| 2009/0168645 A1* | 7/2009 | Tester et al. .................. 370/225 |
| 2009/0172151 A1 | 7/2009 | Davis |
| 2009/0197597 A1 | 8/2009 | Kotecha |
| 2009/0207806 A1 | 8/2009 | Makela et al. |
| 2009/0239531 A1 | 9/2009 | Andreasen et al. |
| 2009/0240789 A1 | 9/2009 | Dandabany |
| 2009/0247170 A1 | 10/2009 | Balasubramanian et al. |
| 2009/0303883 A1 | 12/2009 | Kucharczyk et al. |
| 2009/0310557 A1 | 12/2009 | Shinozaki |
| 2010/0046368 A1 | 2/2010 | Kaempfer et al. |
| 2010/0057930 A1 | 3/2010 | DeHaan |
| 2010/0067379 A1 | 3/2010 | Zhao et al. |
| 2010/0112540 A1 | 5/2010 | Gross et al. |
| 2010/0115278 A1 | 5/2010 | Shen et al. |
| 2010/0115576 A1 | 5/2010 | Hale et al. |
| 2010/0132040 A1 | 5/2010 | Bhagwat et al. |
| 2010/0208614 A1 | 8/2010 | Harmatos |
| 2010/0228843 A1* | 9/2010 | Ok et al. ...................... 709/223 |
| 2010/0240313 A1 | 9/2010 | Kawai |
| 2010/0254316 A1 | 10/2010 | Sendrowicz |
| 2010/0260091 A1 | 10/2010 | Seok |
| 2010/0290397 A1 | 11/2010 | Narayana et al. |
| 2010/0304738 A1* | 12/2010 | Lim .......................... 455/426.1 |
| 2010/0311420 A1 | 12/2010 | Reza et al. |
| 2010/0322217 A1 | 12/2010 | Jin et al. |
| 2010/0325720 A1 | 12/2010 | Etchegoyen |
| 2011/0004913 A1 | 1/2011 | Nagarajan et al. |
| 2011/0040867 A1 | 2/2011 | Kalbag |
| 2011/0051677 A1 | 3/2011 | Jetcheva et al. |
| 2011/0055326 A1 | 3/2011 | Michaelis et al. |
| 2011/0055928 A1 | 3/2011 | Brindza |
| 2011/0058524 A1 | 3/2011 | Hart et al. |
| 2011/0064065 A1 | 3/2011 | Nakajima et al. |
| 2011/0085464 A1 | 4/2011 | Nordmark et al. |
| 2011/0182225 A1 | 7/2011 | Song et al. |
| 2011/0185231 A1 | 7/2011 | Balestrieri et al. |
| 2011/0258641 A1 | 10/2011 | Armstrong et al. |
| 2011/0292897 A1 | 12/2011 | Wu et al. |
| 2012/0014386 A1 | 1/2012 | Xiong et al. |
| 2012/0290650 A1 | 11/2012 | Montuno et al. |
| 2013/0003729 A1 | 1/2013 | Raman et al. |
| 2013/0003739 A1 | 1/2013 | Raman et al. |
| 2013/0003747 A1 | 1/2013 | Raman et al. |
| 2013/0028158 A1 | 1/2013 | Lee et al. |
| 2013/0059570 A1 | 3/2013 | Nara et al. |
| 2013/0086403 A1 | 4/2013 | Jenne et al. |
| 2013/0103833 A1 | 4/2013 | Ringland et al. |
| 2013/0227306 A1 | 8/2013 | Santos et al. |
| 2013/0230020 A1 | 9/2013 | Backes |
| 2013/0250811 A1 | 9/2013 | Vasseur et al. |
| 2014/0269327 A1 | 9/2014 | Fulknier et al. |
| 2014/0298467 A1 | 10/2014 | Bhagwat et al. |
| 2015/0120864 A1 | 4/2015 | Unnimadhavan et al. |

FOREIGN PATENT DOCUMENTS

| | | |
|---|---|---|
| EP | 1771026 | 4/2007 |
| EP | 1490773 | 1/2013 |
| WO | 0059251 | 10/2000 |
| WO | 2004042971 | 5/2004 |
| WO | 2006129287 | 12/2006 |
| WO | 2009141016 | 11/2009 |

OTHER PUBLICATIONS

Perkins, C., et al., Ad hoc On-Demand Distance Vector (AODV) Routing, Network Working Group, Oct. 2003, pp. 1-35.

International Application No. PCT/US2011/047591, International Search Report and Written Opinion dated Dec. 19, 2011.

International Application No. PCT/US2008/061674, International Search Report and Written Opinion dated Oct. 14, 2008.

He, Changhua et al., "Analysis of the 802.11i 4-Way Handshake," Proceedings of the 3rd ACM Workshop on Wireless Security, pp. 43-50, Oct. 2004.

Lee, Jae Woo et al, "z2z: Discovering Zeroconf Services Beyond Local Link," 2007 IEEE Globecom Workshops, pp. 1-7, Nov. 26, 2007.

International Application No. PCT/US2012/059093, International Search Report and Written Opinion dated Jan. 4, 2013.

Wu, Haitao et al., "Layer 2.5 SoftMAC: End-System Based Media Streaming Support on Home Networks," IEEE Global Telecommunications Conference (GLOBECOM '05), vol. 1, pp. 235-239, Nov. 2005.

European Patent Application No. 12879114.2, Search Report dated Jan. 21, 2016.

European Patent Application No. 11823931.8, Search Report dated Aug. 29, 2016.

Chirumamilla, Mohan K. et al., "Agent Based Intrusion Detection and Response System for Wireless LANs," CSE Conference and Workshop Papers, Paper 64, Jan. 1, 2003.

Craiger, J. Philip, "802.11, 802.1x, and Wireless Security," SANS Institute InfoSec Reading Room, Jun. 23, 2002.

Finlayson, Ross et al., "A Reverse Address Resolution Protocol," Nework Working Group, Request for Comments: 903 (RFC 903), Jun. 1984.

* cited by examiner

BANDWIDTH SENTINEL

CROSS-REFERENCE TO RELATED APPLICATIONS

This application claims priority to U.S. Provisional Patent Application No. 61/224,716, filed Jul. 10, 2009, and entitled "Bandwidth Sentinel," which is incorporated by reference herein for all purposes.

BACKGROUND

The present invention relates to the field of communication networks, and in particular to the systems and methods for ensuring the provision of minimum wireless network bandwidth to wireless network devices. Communications networks allow computers and other electronic devices to exchange data. Wireless networks, which exchange data without wires, typically using radio waves, are popular with users due to the ability to send and receive data almost anywhere within the physical coverage area of the network. This allows users to access communication networks, including local area networks, organization or company intranets, virtual private networks, and wide area networks, such as the Internet, anywhere within the physical coverage area of the wireless networks.

Networking devices may handle packets generated by and directed to large numbers of clients over the same interface. The bandwidth or data communications capacity of networking devices limits the amount of data or the rate of network packets passing through network devices. The limits on bandwidth are particularly acute in network devices including wireless network interfaces. If the bandwidth limit of a networking device is reached or exceeded by its clients network traffic, packets may be delayed or dropped. Depending on the type of data being communicated over the network, these traffic disruptions caused by reaching or exceeding bandwidth limit of a networking device may adversely affect the performance of applications on a client. For example, clients receiving voice or streaming video data may be adversely affected by even small delays or losses of packets.

Because of the limits on network device bandwidth, many network devices include quality of service (QoS) functionality. Quality of service functionality allows network administrators to provide different priority for packets or other network data based on factors such as the associated client, user, client application, or data flow. Typically, users, clients, or applications are assigned to different quality of service profiles. Each quality of service profile specifies a quality of service parameters to associated packets or other network data. Networking devices use the scheduling weights to prioritize packet traffic and potentially guarantee a minimum level of performance to some or all of the network data flows.

Unfortunately, there are situations in which a wireless network device cannot provide a minimum level of performance to some or all of its associated network traffic flows. This may be occur for a number of reasons, including RF interference or a client device that is malfunctioning, mis-configured, or near the limit of its reception range. In these situations, many types of network traffic prioritization or compensation will have little or no effect of the network connection performance; thus, allocating additional bandwidth, airtime, or other network resources to these network connections is wasteful. However, because prior QoS functions do not attempt to diagnose the cause of network congestion, they waste network resources on attempting to improve the performance of network connections in these situations.

BRIEF DESCRIPTION OF THE DRAWINGS

The invention will be described with reference to the drawings, in which.

SUMMARY

An embodiment of the invention attempts to provide minimum guaranteed wireless network bandwidth to client network devices, such as user computers, mobile wireless devices, and other devices including wireless network interfaces for exchanging data, by monitoring the performance of network connections to identify client network devices experiencing network congestion while utilizing network bandwidth below a minimum guaranteed bandwidth or airtime usage. Each of these network connections are then analyzed to determine the source of the network congestion. Depending upon the source of the network congestion, an embodiment of the invention may undertake steps to either improve the quality of the network connection or to mitigate the impact of this network connection on other network connections.

For example, in some situations, the network connection has a relatively high quality. In these situations, an embodiment of the invention may allocate additional bandwidth, airtime, or other resources to this network connection to reduce the network congestion.

In another example, in some situations, the network connection has a relative low quality, due to factors such as RF interference, or a client device that is malfunctioning, mis-configured, or near the limit of its reception range. In these situations, allocating additional bandwidth, airtime, or other network resources to these network connections will have little or no effect of the network connection performance. Thus, an embodiment of the invention does not waste additional resources on these types of network connections. Instead, an embodiment of the invention mitigates the impact of this network connection on the other network connections provided by this wireless networking device. Additionally, an embodiment of the invention may transfer the low quality network connection to another wireless networking device that may be able to provide a better quality network connection.

DETAILED DESCRIPTION

Figure 1:
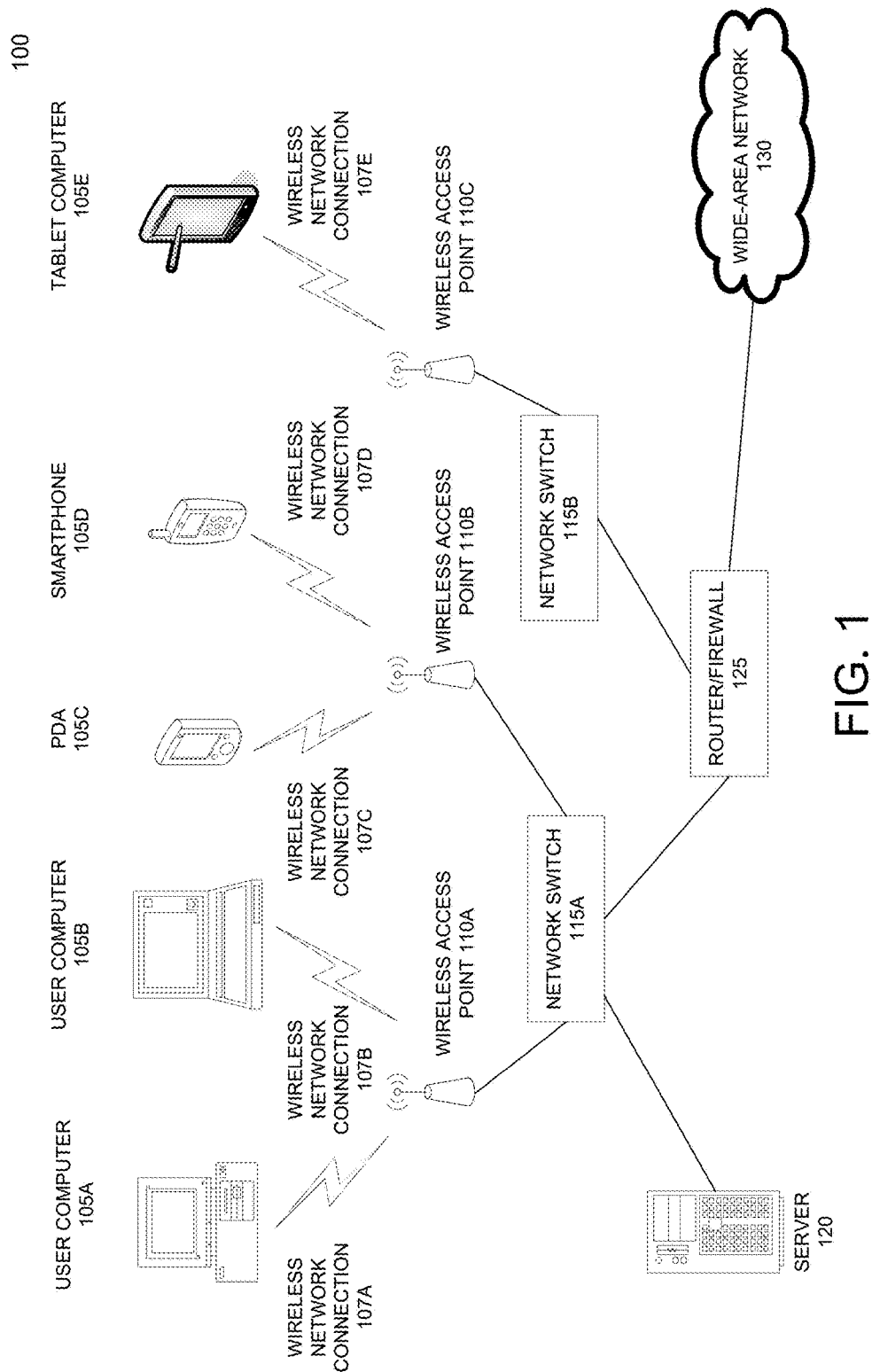
FIG. 1 illustrates an example system suitable for implementing embodiments of the invention.

FIG. 1 illustrates an example system 100 suitable for implementing embodiments of the invention. The system includes client wireless network devices 105, which are electronic devices including wireless network interfaces for exchanging data. Examples of client network devices 105 include desktop user computers 105a, portable user computer 105b, personal digital assistants 105c, smartphone or other mobile device capable of accessing wireless networks 105d, and tablet computer 105e. The system 100 can interface with any type of electronic device, such as a thin-client computer, Internet-enabled mobile telephone, mobile Internet access device, electronic book, or personal digital assistant, capable of accessing wireless communication networks. Although system 100 is shown with five client wireless network devices 105, any number of user computers can be supported.

The client wireless network devices 105 establish network connections 107 with one or more wireless access points 110. For example, client wireless network devices 105a and 105b establish wireless network connections 107a and 107b, respectively, with wireless access point 110a. Similarly, client wireless network devices 105c and 105d establish wireless network connections 107c and 107d, respectively, with wireless access point 110b and client wireless network device 105e establishes wireless network connection 107e with wireless access point 110c. Network connections 107 include the physical and/or logical communications channels between client wireless network devices 105 and the wireless access points 110. The client wireless network devices 105 and wireless access points 110 may use any standard or proprietary wireless networking technologies and/or protocols known in the art, including one or more of the IEEE 802.11 family of wireless networking standards.

Wireless access points 110 may be connected via wired or wireless networks with other local-area network devices, including one or more network switches 115, one or more server computers, databases, and/or data storage 120, and a router and/or firewall device 125. Additionally, the router and/or firewall device may be connected with a wide-area network 130, such as the internet.

Figure 2:
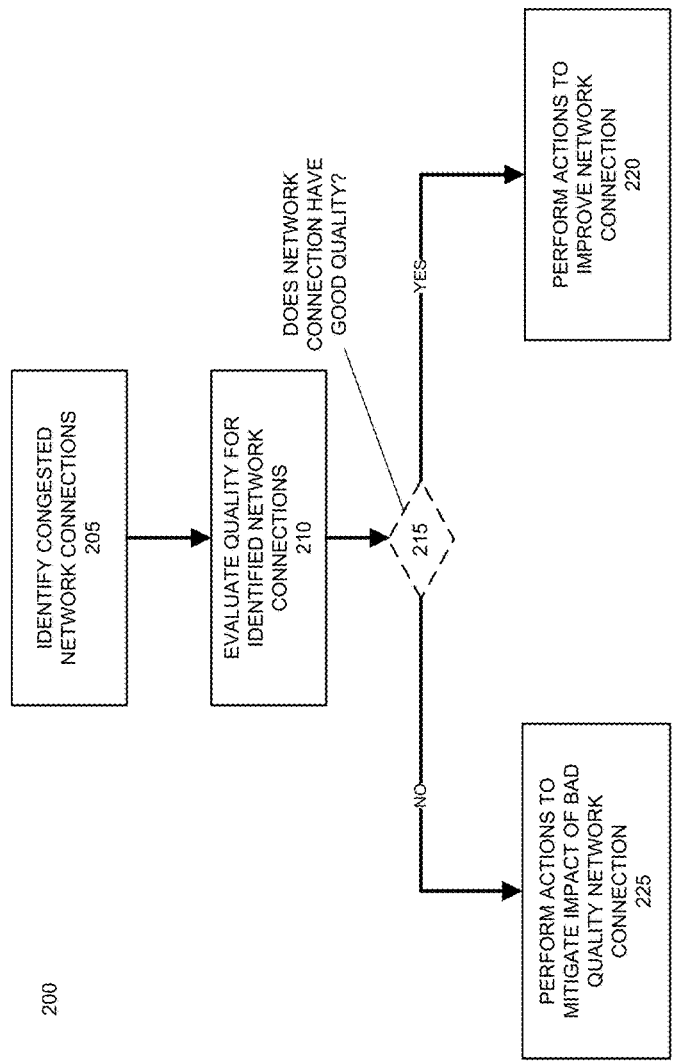
FIG. 2 illustrates a method of operation of a bandwidth sentinel according to an embodiment of the invention.

An embodiment of the invention includes a network device including at least one wireless network interface, such as a wireless access point, including a bandwidth sentinel to attempt to provide client network devices, such as user computers, mobile wireless devices, and other electronic devices including wireless network interfaces for exchanging data, with minimum guaranteed bandwidth usage. FIG. 2 illustrates a method 200 of operation of a bandwidth sentinel according to an embodiment of the invention. Step 205 identifies congested network connections. In an embodiment, step 205 identifies network connections that are suffering excessive queuing backlog and that have actual bandwidth/airtime usage below the minimum guaranteed bandwidth/airtime usage. These network connections are referred to as bandwidth sentinel candidate network connections.

In an embodiment, a wireless network interface, such as a wireless access point, includes a quality of service (QoS) module. The QoS module is responsible for allocating the wireless network bandwidth of the wireless network interface among one or more client network devices connected with the wireless network interface via wireless network connections. Embodiments of the QoS module may use any bandwidth allocation or scheduling technique known in the art, including token bucket allocation techniques. In an embodiment, the QoS module maintains one or more queues for each network connection and associated client network device. Each queue buffers or temporarily stores data, for example in the form of network packets, directed to a connected client network device until it can be transmitted via the appropriate wireless network connection.

In an embodiment of step 205, the QoS module identifies bandwidth sentinel candidate network connections as network connections having backlogged queues and using less than their minimum guaranteed wireless network bandwidth and/or airtime. In an embodiment, a network connection's queue or queues are identified as backlogged if the queue depth is above an overall queue depth average threshold.

Embodiments of the invention may determine the average queue depth threshold as the product of the minimum desired guaranteed bandwidth and the maximum transmission delay for the wireless network connection. Embodiments of the invention may set different threshold values for each connected client network device, allowing network performance to be tailored to the needs and priorities of different applications and users.

Once one or more bandwidth sentinel candidate network connections have been identified, an embodiment of the invention determines whether the backlog is due to poor network connections or to a lack of network bandwidth. To do this, step 210 evaluates the quality of bandwidth sentinel candidate network connections. A wireless network interface may include a wireless network interface driver module that supervises the operation of the wireless network interface hardware. In an embodiment of method 200, the wireless network interface driver module is adapted to evaluate the quality of a network connection associated with a bandwidth sentinel candidate client network device and identify potential wireless network connection problems.

In an embodiment, the wireless network interface driver module monitors the wireless network connections of one or more connected client network devices using measurements including client network device TX/RX bit rate usage; TX/RX retries (for example on per bit rate basis); radio PHY type, and received signal strength indication (RSSI).

In an embodiment of step 210, the wireless network interface driver module receives a selection of one or more bandwidth sentinel candidate network connections from the QoS module. An embodiment of the wireless network interface driver module evaluates the quality of the network connections associated with the selection of bandwidth sentinel candidate network connections. In a further embodiment, this evaluation may classify network connections into two or more quality categories, for example "good" quality connections or "bad" quality connections. In another example of this embodiment, more than two quality categories may be used to identify network connections experiencing congestion for different specific reasons, such as separate quality categories for network connections with high interference, low signal strength, or a mis-configured client network device.

Embodiments of the wireless network interface driver module may use a formula, heuristic, weighting, and/or scoring scheme to evaluate the quality of network connections. For example, the evaluation of wireless network connection quality may be based on wireless network connection attributes including TX/RX bit rate usage; TX/RX retries (for example on per bit rate basis); RSSI; and its radio PHY type. An embodiment of the wireless network interface driver module can evaluate one or more wireless network connection attributes to determine a quality score for a wireless network connection A further embodiment of the invention may evaluate wireless network connection attributes over a period of time, for example 5 seconds, to determine the quality of the wireless network connection.

One example of a formula used to determine a quality score for a wireless network connection in step 210 is as follows:

$$Quality\_Score = \sum^{n} (TXRateScore[k] \times TX_{RXRateSuccess[k]} \times TX_{RXRateUsage[k]}),$$

where the TXRateScore is defined as the bit-rate divided by 1000 (e.g. 54 Mb/s has a TXRateScore of 54,000), the $TX_{RXRateSuccess}$ is defined as $$TX_{RXRateSuccess[k]} = \frac{TX_{RXSuccess[k]}}{TX_{RXSuccess[k]} + TX_{RXretries[k]}},$$

and the $TX_{RXRateUsage}$ may be determined directly.

An embodiment of the wireless network interface driver module may compare this quality score with one or more benchmark quality scores to assign each wireless network connection to a quality category. In an embodiment, different PHY types (e.g. different wireless network interface types) may have different benchmark quality scores. In a further embodiment, the quality scores of one or more network connections may be monitored over time to determine a statistical distribution of the range of quality scores. One or more benchmark quality scores may be determined based on a desired quantile within this distribution of quality scores. For example, a benchmark quality score for a typical wireless network connection may be selected as the median or 50th percentile quality score value in the distribution of quality scores. In another example, a benchmark quality score for a performance critical wireless network connection (such as for a mission-critical application or a high priority user) may be selected as a quality score greater than the median quality score (e.g. the 75th percentile). In another example, a benchmark quality score for a non-critical wireless network connection (such as for a guest user in a network) may be selected as a quality score less than the median quality score (e.g. the 25th percentile).

The wireless network interface driver module then returns the results of this evaluation, such as the classifications of the wireless network connections associated with the selection of bandwidth sentinel candidate network connections. Based on the results of this evaluation, an embodiment of the QoS module may modify its bandwidth and/or airtime allocation to one or more client network devices.

Decision block 215 evaluates the quality scores of the bandwidth sentinel candidate network connections. For bandwidth sentinel candidate network connections having good quality network connections, as determined by an assigned category, quality score, or other indicator, an embodiment of method 200 performs step 220 to improve the performance of the network connection. Embodiments of step 220 may attempt to improve the wireless network connection performance by taking actions including: attempting to allocate more wireless network interface airtime and/or more wireless network interface bandwidth to these bandwidth sentinel candidate network connections (taking some bandwidth and/or airtime away from other normally operating network connections); using cooperative load balancing to allow other network devices, such as other wireless access points, to provide wireless network connections to one or more client network devices, thereby relieving the network device of the burden of providing wireless network connections to some of its client network devices; sending a message or notification to a log, management application, or system administrator; and/or de-associating one or more client network devices from the network device, thereby relieving the network device of the burden of providing wireless network connections to some of its client network devices.

In an example of step 220, the QoS module may increase the bandwidth and/or airtime allocated to a bandwidth sentinel candidate network connection. Allocating additional wireless network bandwidth to a wireless network connection increases the maximum potential data rate. Allocating additional wireless network airtime to a wireless network connection enables the network device to retransmit lost network packets, which increases the actual data rate but not necessarily the maximum potential data rate.

In one embodiment, the QoS module may increase the number and/or rate of tokens assigned to this network connection in a token bucket allocation scheme. For example, the QoS module may increase the size of one or more token buckets associated with the wireless network connection of the client network device. The size of the token bucket may be increased by a predetermined amount or percentage (e.g. a 10% increase of the current token bucket size). In a further embodiment, the size of the token bucket may be limited to a maximum token bucket size value. If the token bucket size reaches its maximum size value, in an embodiment of step 220, the QoS module sends an indicator that the size limit has been reached, such as an event notification or trap, to a management module. The indicator may include information identifying the affected client network device and/or diagnostic information, including, for example, a client network device MAC address, the desired guaranteed wireless network connection bandwidth, and the actual wireless network connection bandwidth.

Conversely, if decision block 215 determines that one or more of the bandwidth sentinel candidate network connections has a low quality network connection, as determined by an assigned category, quality score, or other indicator, an embodiment of method 200 performs step 225 to mitigate the impact of this low quality network connection on the performance of other network connections provided by this network device. Embodiments of step 225 may attempt to mitigate the impact of network connections with connectivity problems on the other network connections provided by this network device by taking actions including: using cooperative load balancing to allow other network devices, such as other wireless access points, to provide wireless network connections to one or more client network devices, thereby relieving the network device of the burden of providing wireless network connections to some of its client network devices; sending a message or notification to a log, management application, or system administrator; and/or de-associating one or more client network devices from the network device, thereby relieving the network device of the burden of providing wireless network connections to some of its client network devices.

In an example of step 225, the QoS module or any other module may attempt to compensate for the bad network connection, for example using cooperative load balancing to transfer the bad quality wireless network connection from the current wireless access point to a different network device, such as a different wireless access point, that may be able to provide the client network device with a better quality connection. In a further embodiment, the QoS module sends an indicator of the bad quality wireless network connection, such as an event notification or trap, to a management module. The indicator may include information identifying the affected client network device and/or diagnostic information, including, for example, a client network device MAC address, the desired guaranteed wireless network connection bandwidth, and the actual wireless network connection bandwidth.

As described above, embodiments of method 200 may utilize more than two quality categories in evaluating network connections. For these embodiments, decision block 215 of method 200 may be extended to evaluate one or more quality scores for each network connection to assign the network connection to the appropriate quality category. Method 200 may be extended with any number of steps similar to steps 220 and/or 225, each of which corresponding with a different quality category. Each of these additional steps may be tailored to perform one or more actions appropriate for the quality category. Although each quality category may have its own set of one or more actions, some or all of these actions may not be unique to the quality category. For example, different quality categories may have some actions in common.

For client network devices with either good or bad network connections, embodiments of the invention may choose to do nothing and ignore the problems of one or more bandwidth sentinel candidate network connections.

In an embodiment, if the wireless network connection of a bandwidth sentinel candidate network connection is congested at the start of the evaluation of the quality of its wireless network connection, but is uncongested by the time this evaluation has been completed, an embodiment of the bandwidth sentinel may choose to leave the wireless network connection of this bandwidth sentinel candidate network connection unchanged.

A further embodiment of the invention measures the effectiveness of the bandwidth sentinel using attributes such as client network device TX/RX bit rate usage; client network device TX/RX retries; client network device TX/RX airtime; queue depths; and client network device TX/RX bandwidth usage. An embodiment of the invention uses these attributes to establish measurements of client network device bandwidth and airtime allocations with or without bandwidth sentinel. Statistical measurements such as distributions and standard deviations may be used to compare the effectiveness of the bandwidth sentinel under a variety of operating conditions. The bandwidth sentinel feature may be activated or deactivated for some or all of the client network devices depending upon operating conditions and network administrator preferences.

As described above, an embodiment of a network device implements a bandwidth sentinel using both QoS and wireless network interface driver modules. Alternate embodiments of a network device may implement a bandwidth sentinel using one or more other types of modules.

In a further embodiment, the bandwidth sentinel may modify the allocation of bandwidth and/or airtime to one or more of the client network devices that are not receiving sufficient bandwidth. For example, the bandwidth sentinel may reduce the rate at which an enlarged token bucket used to increase bandwidth to a client network device is returned to its nominal size. In yet a further embodiment, the bandwidth sentinel may restore the token bucket size if the network connection congestion is relieved and the guaranteed minimum bandwidth for the network connection is met.

In an embodiment, the actions undertaken in step 220 in response to either improve wireless network connection performance for client network devices with good network connections or in step 225 to mitigate the impact of client network devices with bad network connections are different and may be selected based on the intended usage and environment of the network device, the types of client network devices, and/or the types of users of client network devices. The actions performed by the network device in either case may be configured or specified by network administrators or other users.

In an embodiment, a management module associated with one or more network devices including wireless network interfaces may be adapted to configure the bandwidth sentinel. Embodiments of the management module may configure bandwidth sentinels independently or collectively for multiple network devices. The configuration of each bandwidth sentinel may include enabling or disabling the bandwidth sentinel, minimum guaranteed bandwidth for one or more client network devices, congestion thresholds for identifying bandwidth sentinel candidate network connections, and benchmark quality scores for one or more types of wireless network interfaces. A further embodiment of the management module may configure any or all of these bandwidth sentinel attributes independently for different users or client network devices.

Figure 3:
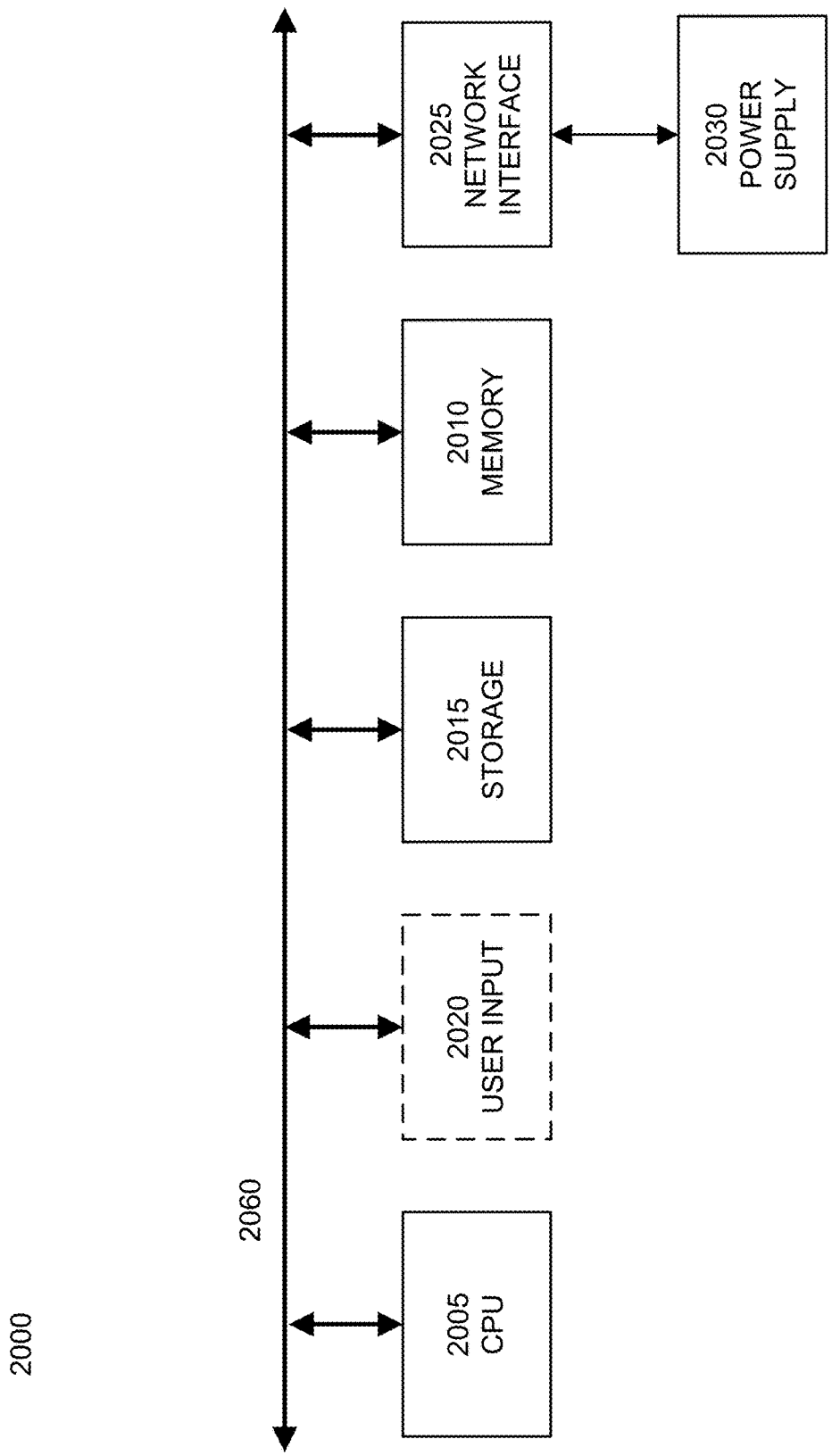
FIG. 3 illustrates an example computer system suitable for implementing an embodiment of the invention.

FIG. 3 illustrates a computer system suitable for implementing an embodiment of the invention. FIG. 3 is a block diagram of a computer system 2000, such as a personal computer or other digital device, suitable for practicing an embodiment of the invention. Embodiments of computer system 2000 include dedicated networking devices, such as wireless access points, network switches, hubs, routers, hardware firewalls, network traffic optimizers and accelerators, network attached storage devices, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices. Memory 2010 may store a firmware image comprising applications and data adapted to be executed by computer system 2000.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include a wired networking interface, such as one or more Ethernet connections to communicate with other networking devices via local or wide-area networks. In a further embodiment, computer system 2000 may be capable of receiving some or all of its required electrical power via the network interface 2025, for example using a wired networking interface power over Ethernet system.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

A power supply 2030 provides electrical power to the computer system 2000. Power supply 2030 may be adapted to draw electrical power from a connection with an electrical power distribution grid. In an embodiment, power supply 2030 is connected with network interface 2025 to draw electrical power for computer system 2000 from one or more wired network connections using a network power standard, such as IEEE 802.3af.

Although embodiments of the invention are discussed with reference to the IEEE 802.11 standard, embodiments of the invention are equally applicable to other standard and proprietary wireless network protocols. Additionally, embodiments of the invention are not limited to 802.11 wireless network connections and may be utilized for any type of communication network where a network connection between a client wireless network device and a wireless network device is required.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for configuring a network connection, the method comprising:
   identifying a wireless network connection of a network between a wireless network device and a client network device, the wireless network connection having network congestion;
   determining a quality score for the wireless network connection, the quality score based on at least two of receiving bit rate usage, transmission bit rate usage, transmission retries, receiving retries, received signal strength indication, and wireless network interface type of the wireless network connection;
   analyzing the wireless network connection, based on the quality score, to determine the wireless network connection is a source of the network congestion;
   determining another quality score for an additional wireless network connection between the wireless network device and another client network device based on at least two of receiving bit rate usage, transmission bit rate usage, transmission retries, receiving retries, received signal strength it and wireless network interface type of the additional wireless network connection;
   determining the additional wireless network connection is a high quality network connection based on the another quality score for the additional wireless network connection;
   allocating additional bandwidth and airtime to the additional wireless network connection based on the determination that the additional wireless network connection is the high quality network connection in order to mitigate impact of the network congestion at the wireless network connection on other network connections of the network;
   using cooperative load balancing to allow other network devices to provide the client network device wireless access to the network in order to mitigate impact of the network congestion at the wireless network connection on the client network device accessing the network.

2. The method of claim 1, further comprising:
   comparing the quality score for the wireless network connection with a benchmark quality score.

3. The method of claim 2, wherein the benchmark quality score is associated with a wireless network interface type.

4. The method of claim 2, wherein the benchmark quality score is associated with a wireless network user type.

5. The method of claim 2, wherein the benchmark quality score is associated with a wireless network client application type.

6. The method of claim 2, wherein the benchmark quality score is based on a quantile of a statistical distribution of previously determined quality scores.

7. The method of claim 1, further comprising:
   allocating additional wireless network interface bandwidth to the wireless network connection.

8. The method of claim 1, further comprising:
   allocating additional wireless network interface airtime to the wireless network connection.

9. The method of claim 1, further comprising:
   transferring the at least one additional wireless network connection to a second wireless network device.

10. The method of claim 1, further comprising:
    transferring the wireless network connection to a second wireless network device.

11. The method of claim 1, further comprising:
    transferring the at least one additional wireless network connection to a second wireless network device.

12. The method of claim 1, further comprising:
    transferring the wireless network connection to a second wireless network device.

13. The method of claim 1, further comprising:
    sending a notification identifying the wireless network connection and the quality score for the wireless network connection.

14. The method of claim 1, further comprising selecting the wireless network connection front a set of wireless network connections provided by the wireless network device based on a management configuration.

15. The method of claim 14, further comprising assigning each of the set of wireless network connections to a congestion threshold.

16. The method of claim 14, further comprising assigning each of the set of wireless network connections to a benchmark quality score.

17. The method of claim 14, further comprising assigning each of the set of wireless network connections to a minimum guaranteed bandwidth.

18. The method of claim 1, wherein the wireless network device includes a wireless access point.

19. The method of claim 1, wherein the wireless network connection enables communication between the wireless network device and the client network device.

20. The method of claim 1, further comprising selecting a first and second quality from a group comprising at least three qualities.

21. A system comprising:
- a means for identifying a wireless network connection of a network between a wireless network device and a client network device, the wireless network connection having network congestion;
- a means for determining a quality score for the wireless network connection, the quality score based on at least two of receiving bit rate usage, transmission bit rate usage, transmission retries, receiving retries, received signal strength indication, and wireless network interface type of the wireless network connection,
- a means for analyzing the wireless network connection, based on the quality score, to determine the wireless network connection is a source of the network congestion;
- a means for determining another quality score for an additional wireless network connection between the wireless network device and another client network device based on at least two of receiving bit rate usage, transmission hit rate usage, transmission retries, receiving retries, received signal strength indication, and wireless network interface type of the additional wireless network connection;
- a means for determining the additional wireless network connection is a high quality network connection based on the another quality score for the additional wireless network connection;
- a means for allocating additional bandwidth and airtime to the additional wireless network connection based on the determination that the additional wireless network connection is the high quality network connection in order to mitigate impact of the network congestion at the wireless network connection on other network connections of the network;
- a means for using cooperative load balancing to allow other network devices to provide the client network device wireless access to the network in order to mitigate impact of the network congestion at the wireless network connection on the client network device accessing the network.

* * * * *